Oct. 17, 1950        C. D. WILLSON        2,525,988
COMBINED SUSPENSION AND STABILIZING SYSTEM

Filed June 17, 1944        3 Sheets-Sheet 1

INVENTOR
Corwin D. Willson

Oct. 17, 1950 C. D. WILLSON 2,525,988
COMBINED SUSPENSION AND STABILIZING SYSTEM
Filed June 17, 1944 3 Sheets-Sheet 2

INVENTOR
Corwin D Willson

Oct. 17, 1950     C. D. WILLSON     2,525,988
COMBINED SUSPENSION AND STABILIZING SYSTEM
Filed June 17, 1944     3 Sheets-Sheet 3
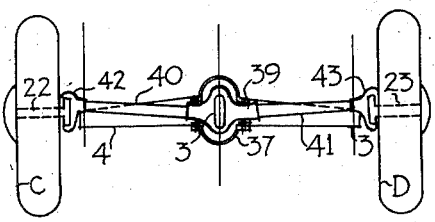
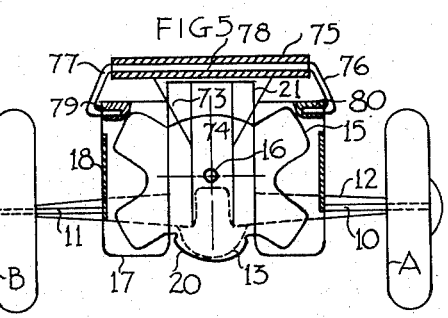
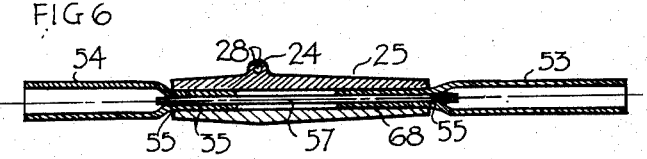
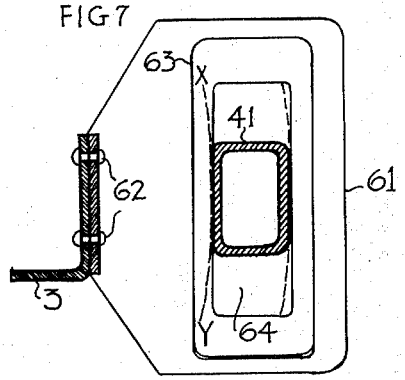
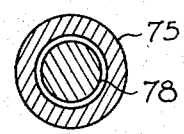
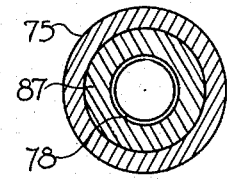
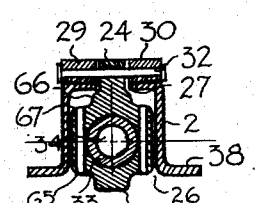
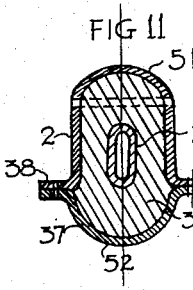
INVENTOR
Corwin D Willson Patented Oct. 17, 1950

2,525,988

UNITED STATES PATENT OFFICE 2,525,988

COMBINED SUSPENSION AND STABILIZING SYSTEM

Corwin D. Willson, Flint, Mich.

Application June 17, 1944, Serial No. 540,774

16 Claims. (Cl. 280—124)

This invention relates to improvements in machines of propulsion and, in particular, to a body having a self-contained power-drive unit comprising a prime mover and spaced roadwheels linked and counterbalanced through a unitary body stiffener and stabilizer for relative displacement in rough transit.

By this invention, I have provided an entirely new and extremely simple system of counterbalanced linkage support for a prime mover: a system permitting resilient relative displacements between prime mover, body and roadwheels without unsprung weight or need of drive axles having universal joints and, at the same time, a system stabilizing the body by a transversely positioned element linked with means having a substantial weight concentrated close to the surface to be traversed: i. e., having a center of gravity much below that of the body itself.

One object of the invention is a self-contained power-drive unit comprising roadwheels and a prime mover that may or may not be rigidly integral with a housing for the driving axles: the prime mover being positioned at one end of the body while being supported both statically and dynamically upon a rigid midpart of the body, whereby the end-heaviness conductive to body slewing in transit on curved roads is avoided. By this is meant that the prime mover, if positioned at the rear end of the body, is supported upon the body midpart forward of the rear wheels; and if positioned at the front end of the body, is supported upon the body midpart rearward of the front wheels.

Another object of the invention is a supporting linkage that may be wholly of individually rigid elements between a body, front and rear pairs of roadwheels and a prime mover: the linkage permitting counterbalanced resilient displacements of part of the prime mover in one direction and another part of the prime mover in the opposite direction relative both to the body and to the roadwheels and without unsprung weight.

Another object of the invention is a unitary suspension system between a body and roadwheels and a prime mover, a primary element thereof being housed in a body stiffener having throughout much of its length an inverted and flanged U-shaped cross section open at the bottom except for a closure for an end part of the bottom fastened removably to the stiffener at each end thereof.

Another object of the invention is a body designed as a unit to receive a suspended propulsive unit comprising prime mover and driving means including spaced roadwheels, one unit being fitted into receiving parts of the other and being joined thereto and removed therefrom by simple means.

Another object of the invention is a body having a bottom provided with a lengthwise rigid and downwardly open slot and with two bearings having longitudinal axes rigidly supported crosswise the slot for the operative support of a unitary suspension system.

Another object of the invention is a suspension system for a mobile body wherein two pairs of roadwheels and a power-drive unit are suspended for relative vertical displacement upon only two spaced fixed parts of the body, one being in the same vertical plane as the transverse turning axis of the body and the other being in a plane parallel thereto and each of the said parts lying athwart the longitudinal center axis of the body.

Another object of the invention is an integral suspension system for a mobile body wherein two pairs of roadwheels and a power-drive unit are suspended for relative vertical displacements upon three rotative elements, one being mounted to rotate longitudinally and two being mounted to rotate transversely of the body and each having a turning axis in a horizontal plane separate from the other two.

Another object of the invention is a pivotal member in a system of wheel suspension and provided with means for being mounted on a fulcrum outside and above a housing for the pivotal member and provided also with means for being entered laterally by a rotatable element.

Another object of the invention is a fulcrum in a system of body linkage with spaced roadwheels, the fulcrum being positioned between a backbone for the body and the center of gravity of the body.

Another object of the invention is a suspension system linking a body and a pair of roadwheels at one end of the body and a self-contained power-drive unit comprising a prime mover operatively attached to spaced roadwheels at the opposite end of the body: the suspension system comprising three or more arms directly linking said power-drive unit and said body for relative vertical displacement, one of said arms pivoting on the body from a point below the center of gravity of the power-drive unit, and another of said arms pivoting on the body from a point above the center of gravity of the body.

Another object of the invention is a suspension system wherein a power-drive unit in a housing that is rigidly integral with a housing for drive axles, is easily displaced relative to the body by means of counterbalance relative to two bearings upon the body and without need of universal joints in said axles.

Another object of the invention is a torsion stabilizer that directly supports a power-drive unit on a body for relative displacement in rough transit.

Another object of the invention is a suspension system particularly adapted to a vehicle of super-lightness and short wheel base.

Another object of the invention is a unitary suspension system between roadwheels, prime mover and body that is strong, light, easy to fabricate, install, remove, grease and service and that makes possible the concentration in a single self-contained unit of the entire propulsive mechanism of a vehicle and thereby a simpler, lighter, safer and cheaper vehicle with a better ride.

In its preferred form, my improved system of suspension distinguishes from prior art in that weight upon a linkage rearward of one bearing and weight on the linkage forward of another bearing are made to counterbalance weight on the linkage between the two bearings and which otherwise would bear fully upon the drive axles. By means of this invention, the drive axles are made easily displaceable in rough transit, even when mounted in a rigid housing that is rigidly integral with the housing for a prime mover, change speed mechanism, differential and other appurtenances of a self-contained power-drive unit. As hereinafter more fully described, my improved suspension comprises a space-enclosing body stiffener resistant to body torque between diagonally paired roadwheels. Mounted on a fulcrum outside the body stiffener for seesaw movement therewithin, is a pivotal member housing a longitudinal rotary element fixed at opposite ends to rigid arms directly supporting the roadwheels. Mounted on a bearing transversely of the body and above the fulcrum, is a body stabilizer that directly supports the prime mover. Resilient means between relatively displaced links of the linkage yieldably resist displacements in a vertical plane of each of the roadwheels and the prime mover relative to adjacent body parts in rough transit.

These and other novel features and objects of the invention are hereinafter more fully described and claimed and the preferred form of construction of my new system of suspension linkage and counterbalance between power-drive unit, roadwheels and body is shown in accompanying drawings, in which:

Fig. 4 is a section taken on line 4—4 of Fig. 2.

Fig. 5 is a section taken on line 5—5 of Fig. 2.

Fig 6 is a longitudinal section of an alternate form of the suspension.

Fig. 7 is a side view in elevation of an alternate form of (static) guide for the suspension arms shown in Fig. 2.

Fig. 8 is a section of the preferred form of stabilizer taken on line 8—8 of Fig. 2.

Fig. 9 is an alternate section of the stabilizer.

Fig. 10 is a section of the backbone, or body stiffener, pivotal member and rotatable element taken on line 10—10 of Fig. 2.

Fig. 11 is a section of the backbone, rotatable element, resilient bushing and closure taken on line 11—11 of Fig. 2.

Fig. 12 is a section of the tapered tubular suspension arm taken on line 12—12 of Fig. 2.

Fig. 13 is a section of the same arm taken on line 13—13 of Fig. 2.

Figure 1:
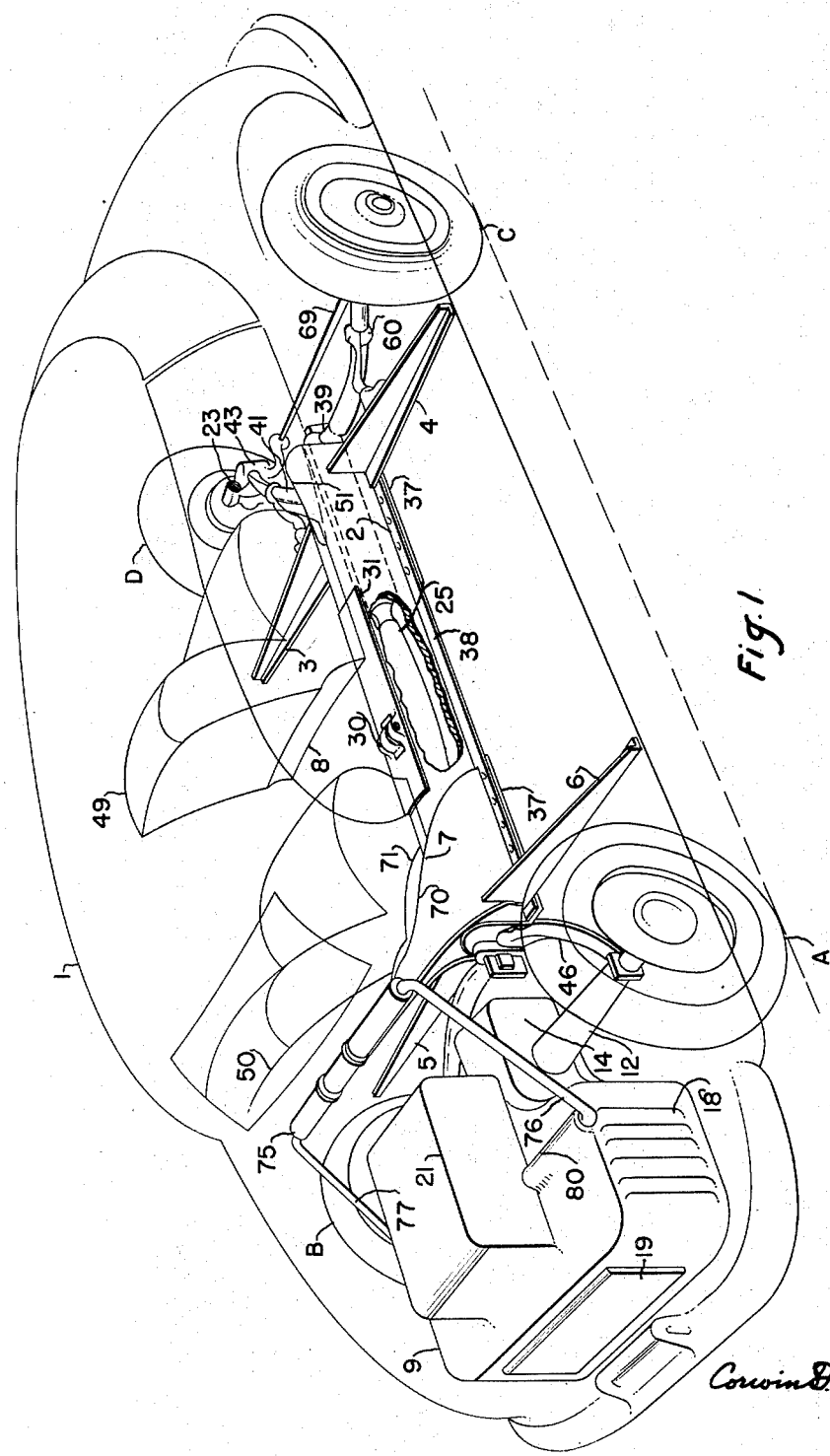
Fig. 1 is a view in perspective of the wheeled body, power-drive unit, integral body stiffener and stabilizer and counterbalanced suspension system.
Figure 2:
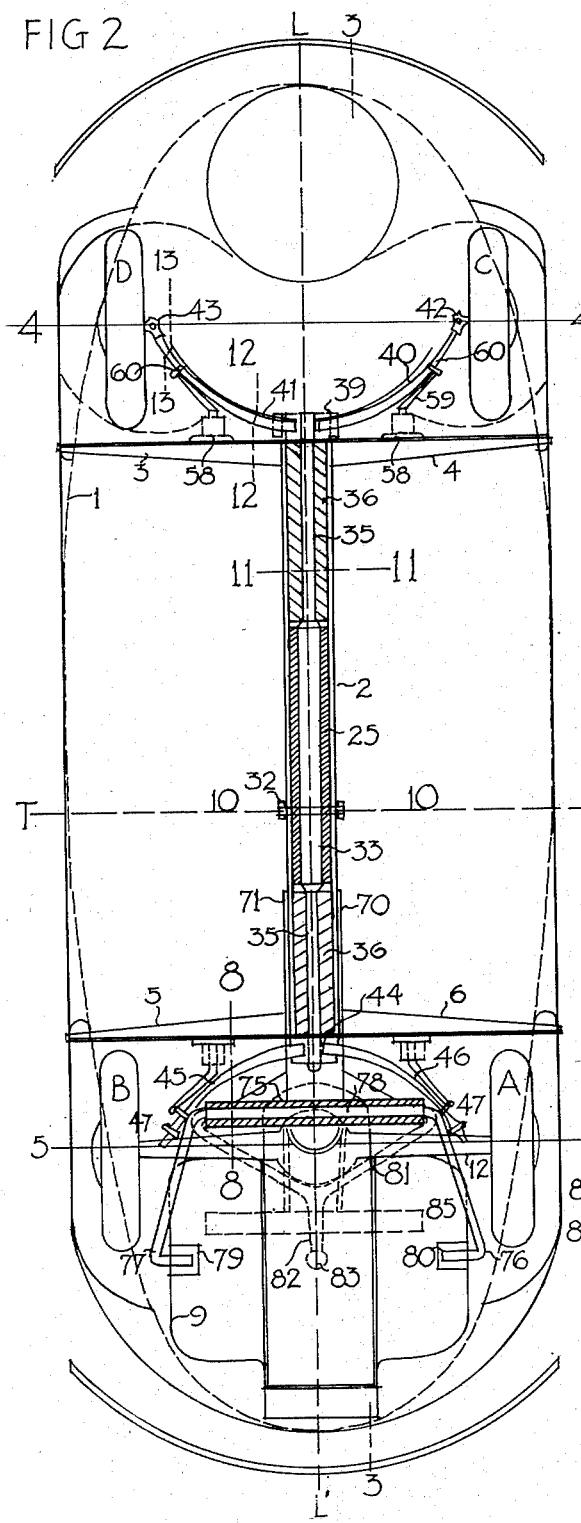
Fig. 2 is a plan view of the same.

The preferred construction of linked and counterbalanced power-drive unit and wheeled body is shown in perspective view in Fig. 1 and in plan view in Fig. 2 in which the space enclosure, or body, is indicated at 1. The primary structural support for the body, hereinafter as a whole referred to as the backbone or body stiffener, comprises an open bottomed midpart 2 lying in and astride line L—L' which is in the same vertical plane as the longitudinal center axis of the body. Midpart 2 has a U-shaped cross section fixed between front crossarms 3 and 4 and rear crossarms 5 and 6 and supporting upwardly inclined stayarm 7, the purpose of which will be hereinafter explained. Midpart 2 and crossarms 3, 4, 5, 6 may be attachments to or deformations in the materials forming the bottom and floor 8 of the body 1 and the proportions shown in the drawings are purposely distorted to assist in clarifying the fundamental features of the structure.

The propulsive mechanism for the body is concentrated in a self-contained power-drive unit 9 comprising a pair of roadwheels A and B keyed to drive axles 10 and 11 in axle housing 12 which is rigidly integral with differential housing 13 and with change-speed housing 14 and with prime mover 15. Since the specific character of the prime mover and its internal hookup with the change speed mechanisms and differential lie largely outside the scope of the invention as claimed, the prime mover is indicated only diagrammatically at 15 as comprising a multi-cylinder combustion engine, such as an eight cylinder type twin double opposed piston engine, with main shaft 16 above and at a right angle to drive axles 10 and 11. The engine 15 is largely enclosed by main cowl 17 having ingress air apertures 18 which may be connected with ducts to air-scoops as I have shown in another place or be only in the form of louvres as here indicated. Egress air aperture 19 may be in the form of a water-cooling radiator above removable pan 20 giving access into the interior of the engine. Sub-cowl 21 covers engine accessories. What is particularly pertinent to the invention is that a compact, lightweight and accessible type of engine is made rigidly integral with means driving a pair of roadwheels, these roadwheels being on opposite sides of one end of the body. While the preferred position of the self-contained power-drive unit as shown in Fig. 1 is at the rear, it is important that a very slight alteration (not shown) in the contours of the lower end of the stayarm 7 permits the positioning of the power-drive unit at the front end of the body 1 without interfering with the legroom of front seat occupants; the only addition then being a universal joint (not shown) between each outer end of drive axles 10 and 11 and steering spindles 22 and 23 supporting wheels C and D in a manner old in the art and not necessary of being here illustrated.

Heretofore, it has not been thought practical to combine all elements of the propulsive mechanism at one end of a light, short wheelbase motorcar. Concentration of as much as 1,000 pounds of mechanism upon one end of a light car chassis threatened to create end-heaviness that would produce slewing effect in negotiating road curves at high speed. Moreover, to make major elements of the power-drive unit rigidly integral heretofore has made it necessary to suspend the unit below the springing and thereby to create so much unsprung weight that this type of design was found useful only on vehicles operative at extremely slow speed, such as milk-delivery trucks and the like. It is apparent that if these obstacles can be overcome so that all the elements of the propulsive mechanism may be concentrated in a single compact mechanism, the cost of production and of maintenance can be substantially reduced. There is another important advantage to be gained. The entire system of manufacturing motorcars can be greatly simplified once a typical motorcar is designed to consist of but three separate but easily assembled parts: (a) the body, (b) the power-drive unit and (c) an integral suspension system. Each can then be made by a separate company, even by a relatively small company of limited capital which the costly complexity of having the various elements of the propulsive mechanism scattered over the entire chassis now prevents and in consequence of which the manufacture of motorcars tends to fall into fewer and fewer hands: the result being that two or three huge companies are enabled to increase the price for a monopoly product made much more complex than its mass use warrants.

The concentration of too much weight at one end of the chassis is overcome in the instant design by suspension means that supports the weight of the power-drive unit both statically and dynamically upon a midpart of the body. If the power-drive unit is mounted in the preferred position at the rear end of the body, its weight is supported on the body forward of the rear wheels; and if the power-drive unit is mounted in the alternate position at the front end of the body, its weight is supported on the body rearward of the front wheels. This is accomplished by the following means: a gudgeon 24 is fixed to an intermediate portion of pivotal member 25 which is enterable laterally through the downwardly open slot 26 of backbone midpart 2 until gudgeon 24 projects upwardly through slot 27 in top of midpart 2 and bearing aperture 28 aligns with bearings 29 and 30 on diffusion plate 31 fastened to midpart 2 in such manner that weight concentrated on shaft 32 (passed through 28, 29, 30) is widely diffused into the backbone, crossarms and body. Shaft 32 and bearings 28, 29, 30 are in the same vertical plane as line T—T' which is in the same vertical plane as the transverse turning axis of the body. Housed in pivotal member 25 is a rotative element 33 having an intermediate round cross-section 34 between narrower, deeper cross-sections 35 immediately outside pivotal member 25. These flat-sided ovular cross-sections 35 pass through resilient bushings 36 enterable into midpart 2 by way of slot 26 and removable closure 37 attached to flange 38 on midpart 2. Fixed to the front end of rotative element 33 is a rigid yoke 39 rigidly fastened to the inner ends of forwardly-extending suspension arms 40 and 41, the outward ends of which are fixed to pivotal mountings 42 and 43 supporting steering spindles 22 and 23. Fixed to the rear end of rotative element 33 is a rigid yoke 44 rigidly fastened to the inner ends of rearwardly extending suspension arms 45 and 46, the outward ends of which are fixed to shackle supports 47 operatively attached to axle housing 12 at 48 adjacent roadwheels A and B. Steering spindles 22 and 23 and outer ends of housed drive axles 10 and 11 are hereinafter collectively described as the radial mountings for the roadwheels.

Rotative element 33 and suspension arms 40, 41, 45, 46 are preferably of tapered tubular construction, the web of the arms tubing being stiffened and lightened by means of a progressive thickening of the web from one end of the arm to the other and by means of being bent to compound curvature. By the Dewey process, an American steel company is able cheaply to form tapered tubing with a wall progressively thickened toward the point of greatest stress. In consequence, it is easily possible and practical to give the circular midsection of rotative element 33 a greater or less thickness than the end sections 35 as desired, and which depends on whether or not rotative element 33 is to be extremely rigid or very slightly resilient. The progressive thickening of the suspension arms is shown by the difference in thickness of the web in Figures 12 and 13. By this means it is possible to connect roadwheels A, B, C, D both transversely and diagonally of the body by means both extremely light and strong. By varying the quality and treatment of the metal used in forming rotative element 33, its midsection 34 may be given any desired degree of flex in torsion and a very minute resilient longitudinal bend be provided in element 33 between opposite ends thereof. Or the suspension arms, by varying the quality and treatment of the metal may be given a slight resiliency adjacent the outward extremities. Any resiliency provided in element 33 will, in effect, create a spring as long as the wheelbase. Thus a minimum of resiliency in element 33 will make possible a substantial relative vertical displacement of the roadwheels in rough transit. In the instant design, element 33 preferably is designed for a substantial rigidity as are the suspension arms 40, 41, 45, 46, provision being made for relative wheel displacement by means other than the resilience of the primary load-bearing members of the suspension linkage here being described.

Because of the pivotal mounting of rotative element 33, opposite ends may seesaw on transverse bearing 29—30, which is purposely placed between the turn-axis of rotative element 33 and the center of gravity G—G' of the body. When wheel C receives up-impact, raising of outer end of arm 40 will both rotate and upwardly tilt the forward end of rotative element 33 which will tend to raise both the inner and outer suspension arm 41. This simultaneous raising of both ends of suspension arm 41 tends to keep pivotal mounting 43 in a more nearly vertical plane which to some degree approximates the effect of the parallelogram mounting of accepted practice. The same impact on wheel C will depress and rotate the rear end of rotative element 33 in a manner to cause a lowering of both ends of rear suspension arm 46 simultaneously, sending much of the impact lifting wheel C into a down impact on wheel B and thence through the tire of wheel B into the roadbed. A similar impact on any of the other wheels results in a similar reaction. Thus, relative displacement of the roadwheels is made possible without any resiliency whatsoever in the tubular elements 33, 40, 41, 45 and 46 directly connecting each roadwheel with the other three and supporting the load of the body upon the wheels at the point of least body movement in rough transit: the intersection of lines L—L' and T—T' between front seat 49 and rear seat 50. Yielding resistance to the turning and pivotal movements of element 33 relative to midpart 2 is supplied by the resilient bushings 36 and the cross sections 35 being narrower than deep cause the bushings 36 to offer more resistance to the turning movements of element 33 than to the pivotal movements thereof. The closed top of midpart 2 is deformed at opposite ends as at 51 to increase the vertical space for the seesaw movements of element 33 within said midpart and the closure 37 is similarly deformed at 52 for the same reason. In actual practice it is only necessary to provide for an up and down movement of 2 inches at opposite ends of element 33 to insure a considerable vertical displacement of the roadwheels from the pivotal movement of element 33 only and, in addition the rotation of element 33 greatly increases the possible vertical displacement of the roadwheels.

In Fig. 6, rotatable element 33 is replaced with fore and aft tubular elements 53 and 54 having cross sections similar to 35 outside pivotal member 25' and tapering to cross sections similar to 34 therewithin and splined at 55 to receive the splined ends 56 of a torsion spring rod or tube 57 yieldingly resisting rotation of elements 53 and 54 in opposite directions under road shock.

In the preferred construction illustrated in Fig. 1 and Fig. 2, the outward ends of suspension arms 40 and 41 are in part guided in displacement in a relatively vertical plane by shock-absorbers 58, here shown to be of the ordinary hydraulic type attached to cross arms 3 and 4 and having torque arms 59 operatively anchored to an intermediate part of the suspension arms by means 60 old in the art. However, even shock-absorbers are not necessary and may be dispensed with or replaced by the static slotted guide 61 shown in Fig. 7 and made of sheet metal, then fastened by bolts or rivets 62 to cross arm 3 or 4 and holding resilient bushing 63 between suspension arm 40 or 41 and slot 64. There is thus supplied a snubbing effect due to the up and down movement of the suspension arm 41 pivoting simultaneously on shaft 32 relative to line T—T' and rotating within pivotal member 25 relative to line L—L'. So far as arm 41 moves in a radius relative to line L—L', the opposite sides of arm 41 shown in Fig. 7 will tend to move straight up and down in the straight sides of slot 64. But so far as arm 41 moves in a radius relative to line T—T' and indicated by broken line X—Y, the left side of arm 41 will be forced to compress the straight left side of the slot in resilient bushing 63 and in an increasing amount toward upper and lower extremities of slot 64. This forced compression of bushing 63 by movement of left side of arm 41 on line X—Y provides a yielding resistance to vertical movement of arm 41 and thus a snubbing action.

Where rotative element 33 is formed of a single tube, it is easily entered into pivotal member 25, the lower portion thereof indicated at 65 being formed to be separable from the upper part 66 and the two parts being joined by bolts (not shown) through bolt holes 67. Pivotal member 25 is tapered toward opposite ends as at 68 to permit a considerable pivotal action within midpart 2. By the removal of bolts from boltholes 67, the removal of closures 37 and the loosening of bolts 62 or means 60, the greater part of the system of suspension thus far described may be removed from the body for easy repair or replacement, as after a collision injuring parts of the system. Tie rod 69 connects the front steering wheels in the usual manner and steering pitman is not shown.

To this point, the description concerns largely improvements, refinements and simplifications of the wheel suspension systems covered by my aforementioned two patents and two pending applications. These improvements comprise in part: (a) the strong but more accessible type of midpart 2; (b) the placing of the fulcrum of the leverage action not only outside midpart 2 but above it so that it is more accessible to oil or replace and closer to the center of gravity of the body as indicated by line G—G'; (Note: the fulcrum may be placed even closer to line G—G' by arranging the seating so that the fulcrum is placed up adjacent the front of the rear seat or adjacent the rear of the front seat without interference with legroom); (c) the design of the cross section of both resilient bushings and rotative element so that longitudinal turning movement is resisted more than pivotal movement; (d) redesign of the pivotal member to make assemblage of the parts of the linkage simpler; (e) the use of tapered tubular arms bent to double curvature; (f) the better hookup of the shock absorbers or static guides with snubbing effect; none of which features are shown in my previous designs.

The suspension of roadwheels fore, aft and on opposite sides of a body directly upon the point of least body movement in rough transit emphasizes the problem of body stability. In the designs covered by my aforementioned two pending applications, the end of the power-drive mechanism furtherest removed from the wheel suspension system had to be suspended upon the body by means practically independent of the wheel suspension system. The problem of body stability and the problem of power-drive unit suspension have been met in the instant design by a body stabilizer that itself directly supports the prime mover portion of the power-drive unit. This stabilizer not only resists the body tendency to roll too much about longitudinal axis L—L', but supports the prime mover in a manner more directly making it an inherent part of the counterbalanced wheel suspension linkage and utilizing part of the weight of the prime mover itself to achieve this counterbalance relative to two fixed points relatively close to the transverse axis T—T'. These and many other advantages gained by my improved design will now be described.

Stayarm 7 comprises rigid side plates 70, 71 attached to opposite sides of midpart 2 adjacent transverse turning axis T—T' and attached also to structural web 72 backwardly and upwardly inclined behind rear seat 50. To the upper end of stayarm 7 and to the upper ends of brace plates 73, 74, which are fixed to side plates 70, 71, is fastened tubular bearing 75, hereinafter called the stabilizer housing. This longitudinally extending housing is held by stayarm 7 transversely of the body, so that it extends a substantial distance either side of longitudinal axis L—L'. Supported for rotation in housing 75 is a body stabilizer having the upper ends of supporting arms 76, 77 fixed to opposite ends of midportion 78 and the lower ends pivotally mounted in bearings 79, 80 attached to opposite sides of power-drive unit 9.

Should a prime mover of a different type be desirable, the stabilizer might be given the alternate form shown in broken lines at 81 in Fig. 2, the arms 76, 77 being joined at the lower end to comprise a single arm 82 attached to the prime mover by means of the universal joint 83 permitting the prime mover to seesaw thereon in rough transit both fore and aft and from side to side.

Stabilizer midportion 78 may comprise two parts whereby arm 76 may swing independently of arm 77. Preferably, stabilizer midportion 78 comprises a torsion spring rod or tube which permits while yieldably resisting relative vertical displacements of wheels A and B, more directly supported by suspension arms 45 and 46. The positioning of housing 75 a substantial distance above rotatable element 33 and at a right angle therewith provides adequate leverage to counteract what otherwise would be the body tendency to turn with element 33 as an axis. To this end, not only is housing 75 given a considerable transverse span but its horizontal axis is positioned above line G—G' which coincides with the center of gravity of the loaded body. Arms 76, 77 anchor housing 75 to the road-hugging concentrated weight of power-drive unit 9 which has an independent center of gravity on line P—P' much below line G—G'. This provides a most effective means for holding the body on an even keel while torsion of stabilizer midportion 78 permits relative displacement of roadwheels A and B and permits the body to bank naturally on road curves.

Figure 3:
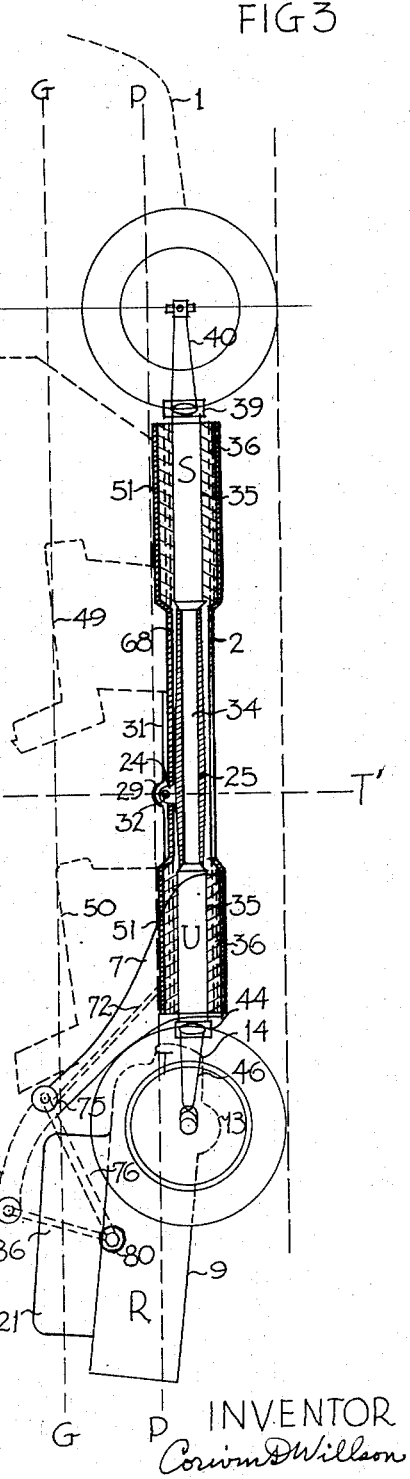
Fig. 3 is a longitudinal section taken on line 3—3 of Fig. 2.

Fig. 3 makes clear the means supporting power-drive unit 9 forward of roadwheels A and B to reduce the slewing tendency previously mentioned. Fig. 3 also illustrates the system of counterbalanced weights that eases relative displacement of all the roadwheels. If weight of power-drive unit rearward of bearings 79, 80 is symbolized by R and weight of roadwheels suspension system forward of bearing 29, 30 is symbolized by S, and if weight of power-drive unit forward of bearings 79, 80 is symbolized by T, and if weight of the roadwheel suspension system rearward of bearing 29, 30 is symbolized by U, then by making RS equal to TU, it is possible to use the principle of counterbalance to lighten the dynamic load on wheels A and B in rough transit when the entire system of suspension tends to operate relative to that part of the body moving least: i. e., at the intersection of lines L—L' and T—T'. Under these conditions, when roadwheel A strikes a road bump, it is not forced to lift the entire weight of the power-drive unit on that side of line L—L' but the weights symbolized by R and S will tend to be tilted downwardly and thereby ease the seesaw upward movement of weights symbolized by T and U which straddle driving axles 10 and 11 in rigid axle housing 12. Thus, in a dynamic sense, much of the effect of the concentrated weight of the power-drive unit is removed from the relative displacements in a vertical plane of wheels A and B in passage over rough ground by means that permit parts of the linkage to "jackknife" easily up and down between bearings 79, 80 and 29, 30: this means being the counterbalance of the parts described.

If it were necessary for an up-impact on wheel A to be absorbed into an adjacent body part through the rapid oscillations of a coil or leaf spring, as is the common practice, the value of counterbalance as described could not be so readily utilized. But, in the system of suspension linkage here described, shock is absorbed not by spring oscillation but by linkage diffusion, that is, by compensatory slight movements of all the linkage parts of the suspension system. The inclusion of the prime mover itself in the counterbalanced linkage system permits the impact of roadshock on wheel A or B to be dissipated in work on the counterbalanced weights, such as R, S, T and U of the linkage, rather than on the body and the spines of the occupants. In consequence, the suspension system is particularly suited to vehicles of relatively short wheel base, such as motorcars of light-weight.

The elongation of stayarm 7 indicated by the broken line at 84 and the positioning of housing 75 at 85 and the substitution of arm 86 for 76, 77 or 82, suggest how the weight distribution may be altered to meet special conditions. By this means, the power-drive unit may be so suspended as to permit the use of universal joints between drive axles and roadwheels A and B in a manner not here shown and old in the art. This is mentioned as a possibility only to stress the fluidity of the power-drive unit mounting here illustrated. By this means it is possible to secure an unusually smooth ride at adequate speeds over uneven ground without the need of such universal joints, though the propulsive mechanism is contained within a rigid housing that is rigidly integral with the housing for the drive axles.

The preferred structure of housing 75 is indicated in Fig. 8 but an alternate form is shown in Fig. 9 wherein a slightly resilient bushing 87 separates housing 75' and stabilizer midportion 78. Opportunities for damping out vibration by similar means in several other places are not shown since the system described is sufficiently flexible in the alternate arrangements illustrated to serve ordinary need.

Line P—P' represents the horizontal plane coincident with the center of gravity of power-drive unit 9. It is to be observed that line P—P' is a substantial distance below line G—G' representing the horizontal plane coincident with the center of gravity of the loaded body. It is also to be observed that an arm supports the power-drive unit pivotally upon a body point below line P—P' and another arm supports the power-drive unit pivotally upon a body point above line G—G'. Thus the suspension system, as described, directly supports a self-contained power-drive unit as a single moving link in a unitary linkage that receives, cancels out, equalizes, damps and diffuses throughout the linkage the rapid succession of localized shocks upon each of the roadwheels. Since each part of the linkage is designed for equipoise, all the parts tend to return swiftly to equilibrium under balanced load on even ground. Being positioned in or adjacent to points of minimal movement in the linkage action, the resilient means, whether as torsion rod or resilient bushings, are where they can yieldingly resist both the up and down movements of body, roadwheels and prime-mover, each relative to the others, within the limits of minimum space and time. It is this factor that makes it possible to bring the entire concentrated weight of a self-contained power-drive unit into the linkage system as a single link operative by counterbalance and leverage under roadshock. As described, it is believed the suspension system and its various parts satisfies each of the stated objects of the invention.

The drawings being illustrative only, are more or less diagrammatic in character and it is to be observed that various changes in the character of the stayarm, for example, or in the stabilizer housing, or the reshuffling of elements now in one turning axis into another to achieve like results, or means fastening the stabilizer torque-arms to the power-drive unit, or the particular character of this unit, or changes in other parts of the mechanism may be made without departing from the spirit and scope of the invention as set forth in the appended claims.

Having thus fully described my invention, its utility and mode of operation, what I claim and desire to secure by Letters Patent of the United States is:

1. In a wheeled body, a body having a front and a rear seat therein, roadwheels fore, aft and on opposite sides of the body, a mounting for the rotation of each of said roadwheels and comprising a rigid suspension arm, a pivotal member rigidly mounted for seesaw movement on the body at a point forward of said rear seat and behind said front seat and above the longitudinal center axis of said pivotal member; a rotative element supported by said member each said arm being directly and rigidly joined to an end extremity of said rotative element.

2. In a wheeled body, a system of tubular linkage comprising a body stiffener having a closed top and a lengthwise bottom slot, and a fulcrum held in fixed relation thereto and outside thereof, and a tubular pivotal member supported on said fulcrum and in part within said stiffener for rocking movement relative thereto, and a tubular rotative element supported by said pivotal member and a pair of forwardly extending tapered tubular arms rigidly fixed to the fore end of said rotative element and a pair of rearwardly extending tapered tubular arms rigidly fixed to the rear end of said rotative element, and means guiding the movement of said arms.

3. In a vehicle, a body, a frame having a lengthwise midpart fixed between transverse endparts, a roadwheel suspension member supported for turning and seesaw movement upon said midpart, a suspension arm fixed to one end of said suspension member and supporting a roadwheel, and a static slotted guide fixed to one of said endparts and holding said suspension arm to predetermined movement within the slot thereof; and a rubber bushing making resilient the confines of said slot.

4. In wheel suspension, a body including a rigid housing positioned centrally lengthwise on the bottom of the body and mountings for the rotation of roadwheels fore, aft and on opposite sides of the housing and primary suspension for said body on said mountings and comprising a fulcrum lying in greater part outside said housing and intermediate opposite ends thereof and rigid suspension arms extending from said ends to said mountings and means operative through said housing to support said arms and said mountings for relative vertical displacements on said fulcrum.

5. In wheel suspension, a body including a stiff hollow bottom portion extending centrally lengthwise of the body, roadwheels fore, aft and on opposite sides of the body, radial mountings for the rotation of the roadwheels, a pair of rigid suspension arms extending between the inside of said hollow portion and said mountings, a fulcrum lying wholly outside said hollow portion and between said pair, a pivotal member supported on said fulcrum and a resilient rotative element fixed between said pair and supported by said member.

6. In wheel suspension, a body having a fulcrum, radial mountings for roadwheels fore, aft and on opposite sides of the fulcrum and primary support for said mountings and pivotally mounted on the fulcrum for movement in a vertical plane and including a rotative element having a midpart circular in transverse section and opposite ends having in cross section a width less than and a depth greater than the diameter of said midpart, and a pair of rigid yokes fixed to said opposite ends and outwardly tapered suspension arms between said yokes and said mountings.

7. In a combined suspension and stabilizing system, a body including a largely enclosed housing extending centrally lengthwise of the body, steering roadwheel spindles positioned at some distance in front and on opposite sides of the housing and housed rear axles positioned at some distance behind and on opposite sides of the housing, and suspension arms journaled in opposite ends of the housing and having outwardly bowed extremities attached to said spindles and axles; and a second housing fixed athwart and substantially above and behind the aft end of said first-named housing.

8. In wheel suspension, front and rear pairs of roadwheels, a body including a lengthwise hollow bottom stiffener having a front end back of, and a back end forward of, the radial centers of said wheels, and a fulcrum having a lengthwise midportion lying outside the lengthwise interior of said stiffener and a pivotal member extending lengthwise within the stiffener and mounted on said midportion, and primary wheel support operative on said fulcrum and comprising rigid suspension elements inwardly converging from said radial centers and extending into said pivotal member and operative through said ends.

9. In wheel suspension, a body, mountings for the rotation of roadwheels fore, aft and on opposite sides thereof and elements of a system of suspension between said body and mountings and concentrated back of the front, and forward of the back roadwheels and including a body-stiffening housing opposite ends thereof each having an inverted U-shaped interior and a slot downwardly open in the lengthwise center axis of the body; and an intermediate outer part of the top of said housing having a pair of upwardly projecting bearing supports and a shaft outside said housing and between said supports and supporting another of said elements for pivotal movements within the housing.

10. In wheel suspension, a body, steerable mountings for the rotation of roadwheels on opposite sides of the body and elements of a system of suspension between said mountings and said body and including a yoke journaled on the body in the lengthwise center axis thereof, and outwardly and forwardly extending suspension arms fixed between said yoke and said mountings, each arm comprising a metal web tapered, tube-like and bent to compound curvature.

11. In wheel suspension, a supported body including a hollow bottom stiffener, and a supporting roadwheel, and a cross-arm fixed at an angle to said stiffener at one end thereof and extending outwardly past the outer parts of said roadwheel, a radial mounting for said roadwheel and a suspension arm journaled in said end of said stiffener and extending in an outward curve to and for the support of said mounting, and means carried by said crossarm for guiding said arm.

12. In wheel suspension, a linkage comprising a body having a rigid housing extending lengthwise in the center of the body bottom, and a roadwheel, and a radial mounting for the rotation of the roadwheel and a bowed suspension arm for the support and vertical displacement of the mounting, and a resilient bushing held in said housing; said arm being mounted for rotation and pivotal movement in said bushing and having a cross section deeper than wide whereby said bushing yieldingly resists turning of said arm more than the pivotal movement thereof.

13. In wheel suspension, a body, roadwheels fore, aft and on opposite sides thereof, a pair of steering spindles and a pair of housed axles for the rotation of said roadwheels, backwardly bowed suspension arms connecting said spindles and forwardly bowed suspension arms supporting said housed axles, a pivotal member mounted for seesaw movement on the body at a point nearer the heavier end thereof and said suspension arms journaled for rotative movement in opposite ends of said pivotal member.

14. In a vehicular suspension and stabilizing system, a single tubular body stiffener having a downwardly slotted interior the lengthwise axis thereof extending centrally between spaced roadwheels fore and aft, and a tubular housing athwart said axis and fixed on said stiffener and laterally projecting well beyond the nearest end of the stiffener and above the tops of the roadwheels.

15. In wheel suspension, a body, roadwheels fore, aft and on opposite sides thereof, a forwardly extending suspension member between and operatively supporting the forewheels and having a rearwardly extending central portion providing a bearing of other than round cross section, and a rearwardly extending suspension member between and operatively supporting the aft wheels and having a forwardly extending central portion providing a bearing of other than round cross section, a body stiffener extending centrally lengthwise of the body and supporting a pair of resilient bushings for said bearings, and a torsion element having opposite ends keyed to said central portions; the structure being such that vertical displacement of one of said roadwheels relative to said body causes said torsion element to transmit force to compensatingly displace other of said roadwheels except as said force is expended in twisting said element and in temporarily deforming said bushings.

16. A body having a single hollow body stiffener fixed centrally lengthwise of the body, roadwheels on opposite sides of said stiffener, a rigid axle housing having opposite ends supporting said roadwheels for rotation, and a system of suspension for said axle housing and including two rotative elements each shorter than said stiffener: one of said elements projecting from one end and the other projecting from the opposite end of said stiffener, and a single torsion member fixed to and between said elements.

CORWIN D. WILLSON.

REFERENCES CITED

The following references are of record in the file of this patent:

UNITED STATES PATENTS

| Number | Name | Date |
|---|---|---|
| 143,628 | Kamphaus | Oct. 14, 1873 |
| 411,036 | Johnson | Sept. 17, 1889 |
| 729,737 | Collins | June 2, 1903 |
| 917,309 | Kando | Apr. 6, 1909 |
| 1,089,257 | Park et al. | Mar. 3, 1914 |
| 1,155,801 | Dearing | Oct. 5, 1915 |
| 1,189,284 | Nelson | July 4, 1916 |
| 1,438,484 | Garson et al. | Dec. 12, 1922 |
| 1,470,906 | Bueter | Oct. 16, 1923 |
| 1,800,888 | Johnson | Apr. 14, 1931 |
| 1,801,176 | Reading | Apr. 14, 1931 |
| 1,984,916 | Bullock | Dec. 18, 1934 |
| 1,991,619 | Mackenzie | Feb. 19, 1935 |
| 1,995,529 | Anderson | Mar. 26, 1935 |
| 2,043,542 | Johnson | June 9, 1936 |
| 2,090,561 | Wagner | Aug. 17, 1937 |
| 2,105,553 | Schroter et al. | Jan. 18, 1938 |
| 2,121,687 | Daus | June 21, 1938 |
| 2,133,633 | Rabe et al. | Oct. 18, 1938 |
| 2,176,125 | Eliot | Oct. 17, 1939 |
| 2,200,177 | Klavik | May 7, 1940 |
| 2,221,196 | Klavik | Nov. 12, 1940 |
| 2,228,732 | Rabe | Jan. 14, 1941 |
| 2,242,030 | Hicks | May 13, 1941 |
| 2,246,609 | Townsend | June 24, 1941 |
| 2,251,698 | Willson | Aug. 5, 1941 |
| 2,256,885 | Bruss | Sept. 23, 1941 |
| 2,265,518 | Coote | Dec. 9, 1941 |
| 2,273,503 | Couse | Feb. 17, 1942 |
| 1,305,305 | Porsche | Dec. 15, 1942 |
| 2,305,795 | Schieferstein | Dec. 22, 1942 |
| 2,346,123 | Willson | Apr. 4, 1944 |

FOREIGN PATENTS

| Number | Country | Date |
|---|---|---|
| 86,257 | Austria | June 15, 1920 |
| 191,116 | Switzerland | Sept. 1, 1937 |
| 192,406 | Great Britain | Jan. 26, 1923 |
| 259,721 | Italy | Aug. 2, 1928 |
| 304,695 | Great Britain | Jan. 23, 1929 |
| 427,907 | Great Britain | May 2, 1935 |